UNITED STATES PATENT OFFICE.

CHARLES A. HANSEN, OF SCHENECTADY, NEW YORK, ASSIGNOR TO GENERAL ELECTRIC COMPANY, A CORPORATION OF NEW YORK.

METHOD OF PRODUCING FERROBORON.

982,135.  Specification of Letters Patent.  Patented Jan. 17, 1911.

No Drawing.  Application filed December 22, 1908.  Serial No. 468,842.

*To all whom it may concern:*

Be it known that I, CHARLES A. HANSEN, a citizen of the United States, residing at Schenectady, in the county of Schenectady, State of New York, have invented certain new and useful Improvements in Methods of Producing Ferroboron, of which the following is a specification.

My invention relates to the reduction of boron compounds in an electric furnace.

Boron is used in metallurgical industries, where it is most commonly employed as an alloy of iron, known as ferro-boron. Ferroboron should be low in carbon content.

According to my invention, I employ silicon as a reducing agent in the production of ferro-boron, and in this way avoid not only the introduction of carbon, but provide for the easy removal of heavy metals associated with the boron, which combine during the reaction with the silicon to form fusible silicates.

Although my invention is not limited to the reduction of any particular mineral or compound containing boron, I will explain it in connection with the reduction of Colemanite, a calcium compound of boron. Colemanite is a colorless to milky-white or gray mineral with an uneven fracture and a vitreous luster, having the chemical formula $Ca_2B_6O_{11}.5H_2O$.

In applying my present invention to the reduction of Colemanite the steps are as follows: The mineral is first dehydrated by heating it to a temperature of about 450° C. in a suitable container. It is next reduced to powder form and mixed with powdered ferro-silicon, which is cheaper than the pure metallic silicon. As it is the aim to produce a ferro-alloy of boron, the ferro-silicon answers just as well, and, in fact, if silicon alone were used iron would have to be added. The amount of ferro-silicon added depends upon its content of silicon. In any case, enough ferro-silicon must be added to provide sufficient silicon to reduce all of the boron and slag off with the calcium oxid liberated. The powdered mass is next mixed with a suitable binder, such, for example, as water-glass, and pressed into pellets. The pellets are heated in a suitable furnace, such as the Moissan arc furnace, to a temperature over 2000° C. The silicon reduces the boron, and is itself oxidized to form silica, which combines with the calcium to form a slag of calcium silicate, which separates perfectly from the metal matrix. The amount of carbon introduced from the carbon electrode of the furnace is not harmful.

If desired, other forms of furnaces can be used to heat the charge to the reaction temperature. For example, a suitable resistance furnace can be used of the general type now employed for the production of ferro-silicon.

What I claim as new and desire to secure by Letters Patent of the United States, is—

1. The process, which consists in subjecting a boron compound to the reducing action of silicon at an elevated temperature and alloying the reduced boron with a metal.

2. The process of producing ferro-boron, which consists in heating a boron compound in the presence of ferro-silicon.

3. The process of producing ferro-boron, which consists in heating Colemanite in the presence of silicon and alloying the reduced boron with metallic iron.

4. The process of reducing a compound of boron, which consists in heating it in the presence of metallic silicon and iron to a temperature of about 2000° C.

5. The process, which consists in heating Colemanite in the presence of silicon to a temperature of about 2000° C. and alloying the reduced boron with a metal.

6. The process, which consists in heating an alkaline earth compound of boron in the presence of silicon and a metal forming an alloy with boron.

In witness whereof, I have hereunto set my hand this 21st day of December, 1908.

CHARLES A. HANSEN.

Witnesses:
  BENJAMIN B. HULL,
  HELEN ORFORD.